United States Patent
Nagar et al.

(10) Patent No.: US 11,889,569 B2
(45) Date of Patent: Jan. 30, 2024

(54) DEVICE PAIRING USING WIRELESS COMMUNICATION BASED ON VOICE COMMAND CONTEXT

(71) Applicant: International Business Machines Corporation, Armonk, NY (US)

(72) Inventors: Raghuveer Prasad Nagar, Kota (IN); Sarbajit K. Rakshit, Kolkata (IN); Reji Jose, Bangalore (IN); Gurunath Rampur, Bengaluru (IN)

(73) Assignee: International Business Machines Corporation, Armonk, NY (US)

(*) Notice: Subject to any disclaimer, the term of this patent is extended or adjusted under 35 U.S.C. 154(b) by 288 days.

(21) Appl. No.: 17/444,716

(22) Filed: Aug. 9, 2021

(65) Prior Publication Data

US 2023/0044417 A1    Feb. 9, 2023

(51) Int. Cl.
| | | |
|---|---|---|
| H04W 4/00 | (2018.01) | |
| H04W 76/14 | (2018.01) | |
| H04W 4/02 | (2018.01) | |
| G10L 15/08 | (2006.01) | |

(Continued)

(52) U.S. Cl.
CPC ........... *H04W 76/14* (2018.02); *G10L 15/083* (2013.01); *G10L 15/22* (2013.01); *H04W 4/023* (2013.01); *H04W 4/029* (2018.02); *G10L 2015/223* (2013.01)

(58) Field of Classification Search
CPC ..... H04W 76/14; H04W 4/029; H04W 4/023; G10L 15/083; G10L 15/22
See application file for complete search history.

(56) References Cited

U.S. PATENT DOCUMENTS

| 8,699,944 B2 | 4/2014 | Malamud |
| 9,305,411 B2 | 4/2016 | Ricci |
| 9,698,999 B2 | 7/2017 | Mutagi |

(Continued)

FOREIGN PATENT DOCUMENTS

| CN | 114631095 A * | 6/2022 | ............. G06F 40/20 |
| EP | 2683147 B1 | 2/2019 | |

OTHER PUBLICATIONS

Mell, et al., "The NIST Definition of Cloud Computing", National Institute of Standards and Technology, Special Publication 800-145, Sep. 2011, 7 pages.

(Continued)

*Primary Examiner* — Erika A Washington
(74) *Attorney, Agent, or Firm* — Michael A. Petrocelli

(57) ABSTRACT

Pairing of multiple devices is initiated using a computer in an artificial intelligence (AI) ecosystem. A command is received at a computer to perform a user activity at a location which includes pairing a user device to a selectable device at the location. The context of the command is analyzed including a historical corpus regarding previous pairings and connection preferences. A device at the location is selected based on the analysis and the determining of the user activity. Pairing is automatically initiated for the user device to the selected device at the location based on the analysis of the context of the command. The automatic initiation includes adjusting settings on the user device based on the analysis of the context of the command. The user device is automatically paired to the selected device at the location to perform the user activity.

20 Claims, 9 Drawing Sheets

(51) Int. Cl.
*G10L 15/22* (2006.01)
*H04W 4/029* (2018.01)

(56) References Cited

U.S. PATENT DOCUMENTS

| | | |
|---|---|---|
| 2002/0022453 A1 | 2/2002 | Balog |
| 2010/0330909 A1 | 12/2010 | Maddern |
| 2014/0046664 A1 | 2/2014 | Sarkar |
| 2021/0217423 A1* | 7/2021 | Rakshit .................. G10L 15/22 |
| 2022/0390910 A1* | 12/2022 | Ferguson ............... G05B 15/02 |

OTHER PUBLICATIONS

Stables, James, "Build an Alexa smart home: How to connect lights, plugs and more", The Ambient, Jul. 1, 2021, 9 pages, <https://www.the-ambient.com/how-to/how-to-set-up-your-alexa-smart-home-415>.

* cited by examiner

DEVICE PAIRING USING WIRELESS COMMUNICATION BASED ON VOICE COMMAND CONTEXT

BACKGROUND

The present disclosure relates to dynamic pairing of devices, including mobile devices, at a location using electronic communication connection protocols between devices, such as short-range wireless technology.

In an example, device need to pair, or register or have authorized communication to perform various multi-device activities. For instance, devices can communicate using short-range wireless technology and communication protocols. Different protocols can be used for device pairing. Once the devices are paired, the devices can communicate with each other.

In any multi-device communication ecosystem, ad-hoc pairing can include one or more devices, and a user may search for a device from a list of available wireless devices before pairing by manually selecting the device. Thus, the user performs various manual activities to pair or register a user device with a selected device. This can be time consuming for the user, may require selection of other options on the user's phone to complete the pairing, and can result in lost productivity.

SUMMARY

The present disclosure recognizes the shortcomings and problems associated with current techniques for dynamic pairing of devices at a location to complete an activity or user activity.

The present invention includes systems and methods for pairing a device with one or more other devices in a user-friendly manner. In one aspect devices can pair to perform various multi-device activities. Once the devices are paired, the devices can communicate with each other and perform a collaborative task.

Thereby, in methods and systems according to the present invention, a device can pair to one or more devices at a location by automatically pairing the devices.

In an aspect according to the present invention, a computer-implemented method for pairing multiple devices in an artificial intelligence (AI) ecosystem, which includes receiving, at a computer, a command to perform a user activity at a location which includes pairing a user device to a selectable device at the location. The method includes analyzing, using the computer, context of the command. The analysis of the context of the command includes an analysis of the user activity to determine device parameters for the user activity, and the analysis of the context of the command includes an analysis of a historical corpus regarding pairings and connection history and preferences. The method includes determining possible pairing devices based on the analysis including the device parameters. The method includes selecting a device at the location from the possible pairing devices based on the analysis. The method includes initiating pairing of the user device to the selected device at the location based on the analysis of the context of the command, and automatically pairing the user device to the selected device at the location to perform the user activity.

In a related aspect, the command is a voice command.

In a related aspect, the receiving of the command can include receiving the command at an AI voice assistance system.

In a related aspect, the device at the location can, at least in part, be an AI connected system.

In a related aspect, the method further includes determining specifications for the user device to pair with the possible pairing devices based on the analysis including the analysis of the historical corpus. The specifications including pairing protocols. The method includes the selecting of the device at the location from the possible pairing devices being based on the analysis and the determined specifications. The method includes the initiating of the pairing of the user device to the selected device at the location being based on the analysis of the context of the command, and the initiation including adjusting settings on the user device based on the determining of the specifications for the user device.

In a related aspect, the method further including determining which of a plurality of devices to pair with the user device, based on the analysis of the context of the command.

In a related aspect, the method further including determining a length of time paired devices will remain paired, based on a type of activity being performed using the user device.

In a related aspect, the method further including identifying a user activity with the user device at the location using the computer and the AI voice assistance system; and determining which of a plurality of devices at the location to pair with the user device, based on the analysis of the context of the command and the identification of the user activity.

In a related aspect, the method further including evaluating security in relation to pairing the user device with the device at the location.

In a related aspect, the method further including evaluating security in relation to pairing the user's device with the device at the location; and generating voice based security questions for a user based on the evaluated security, the voice based security question including permission for pairing.

In a related aspect, the method further including identifying when a device of a plurality of devices in the location is currently engaged in an activity; and identifying an alternate device of the plurality of devices for pairing with the user device, in response to the identification of the device being engaged.

In a related aspect, the method further including determining a user activity being performed with the user device; and wherein the identification of the alternate device includes determining one or more alternate devices at the location which can be used for the user activity.

In a related aspect, the method further including generating a model, using the computer, which at least in part, incorporates the analyzing of the context of the command. The model including: updating the analysis of the context of the command; updating the adjustment of the settings on the user device based on the updated analysis; updating the determination of the user activity; updating the selection of the device at the location to perform the updated user activity; and updating the automatic pairing of the user device to the updated selected device to perform the user activity.

In a related aspect, the method further including iteratively generating the model to produce updated models.

In a related aspect, the method further including determining a workflow function for the user device based on the activity; analyzing devices at the location for availability and compatibility with the user device; and determining an updated workflow for the location based the availability and compatibility of the available devices at the location with the user device.

In a related aspect, the method further including determining, using the historical knowledge corpus, which of a plurality of devices at the location to pair to the user device.

In a related aspect, the method further including identifying the activity of the user by analyzing information received from the user device; and determining which devices of a plurality of devices at the location to pair to the user device based on the activity.

In another aspect, according to an embodiment of the present invention, a system using a computer for initiating pairing multiple devices in an artificial intelligence (AI) ecosystem, includes a computer system comprising; a computer processor, a computer-readable storage medium. Program instructions stored on the computer-readable storage medium are executable by the processor, to cause the computer system to perform the following functions to; receive, at a computer, a command to perform a user activity at a location which includes pairing a user device to a selectable device at the location; analyze, using the computer, context of the command, the analysis of the context of the command including an analysis of the user activity to determine device parameters for the user activity, and the analysis of the context of the command including an analysis of a historical corpus regarding pairings and connection history and preferences; determine possible pairing devices based on the analysis including the device parameters; select a device at the location from the possible pairing devices based on the analysis; initiate pairing of the user device to the selected device at the location based on the analysis of the context of the command; and automatically pair the user device to the selected device at the location to perform the user activity.

In a related aspect, the command can be a voice command.

In another aspect according to present invention, 20. A computer program product for initiating pairing multiple devices in an artificial intelligence (AI) ecosystem, the computer program product comprising a computer readable storage medium having program instructions embodied therewith, the program instructions executable by a computer to cause the computer to perform functions, by the computer, comprising the functions to: receive, at a computer, a command to perform a user activity at a location which includes pairing a user device to a selectable device at the location; analyze, using the computer, context of the command, the analysis of the context of the command including an analysis of the user activity to determine device parameters for the user activity, and the analysis of the context of the command including an analysis of a historical corpus regarding pairings and connection history and preferences; determine possible pairing devices based on the analysis including the device parameters; select a device at the location from the possible pairing devices based on the analysis; initiate pairing of the user device to the selected device at the location based on the analysis of the context of the command; and automatically pair the user device to the selected device at the location to perform the user activity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to bibliographical meanings, the terms and words are used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Figure 1:
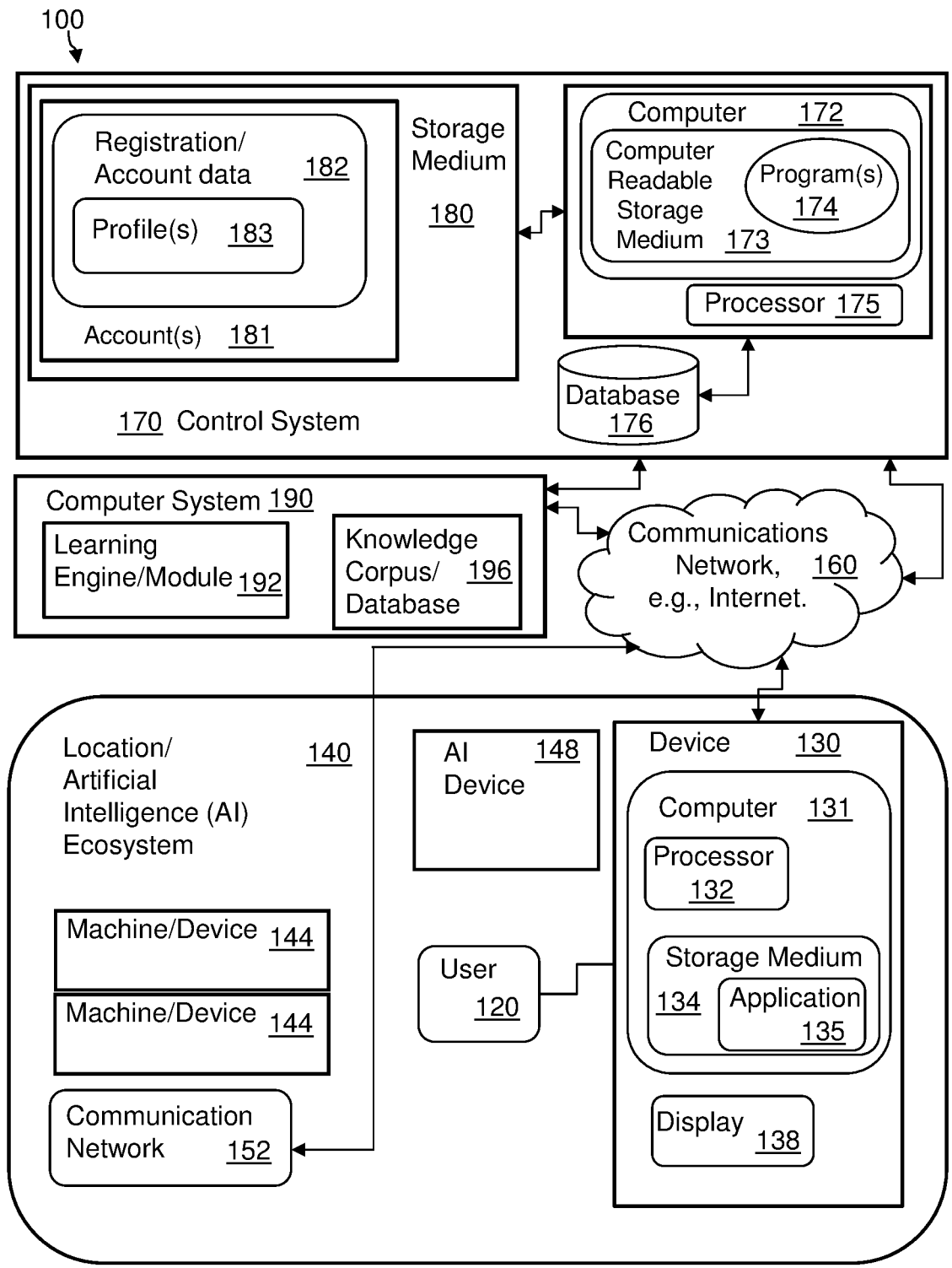
FIG. 1 is a schematic block diagram illustrating an overview of a system, system features or components, and methodology for pairing multiple devices in an artificial intelligence (AI) ecosystem, according to an embodiment of the present disclosure.
Figure 2:
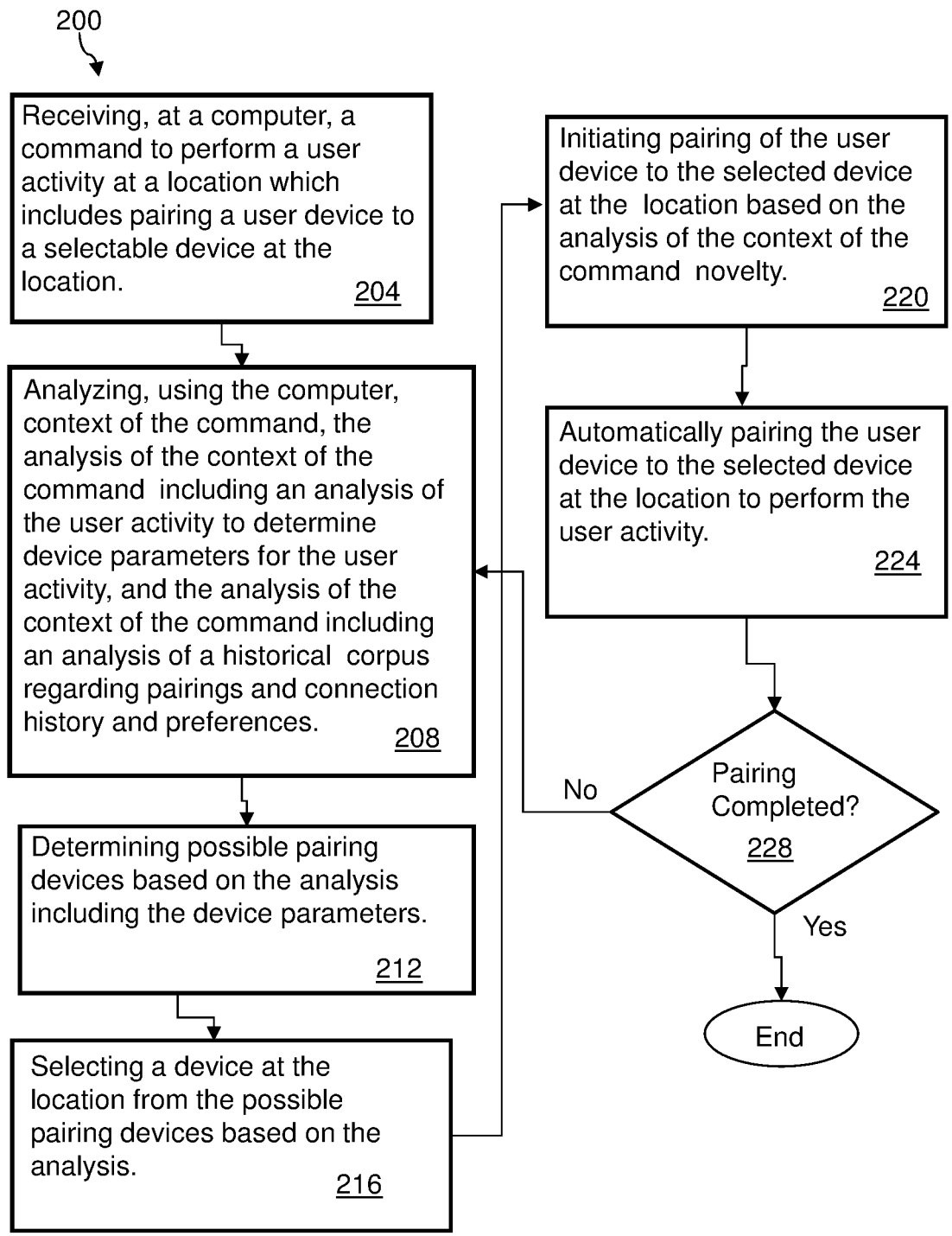
FIG. 2 is a flow chart illustrating a method, implemented using the system shown in FIG. 1, for pairing multiple devices in an artificial intelligence (AI) ecosystem, according to an embodiment of the present disclosure.
Figure 3:
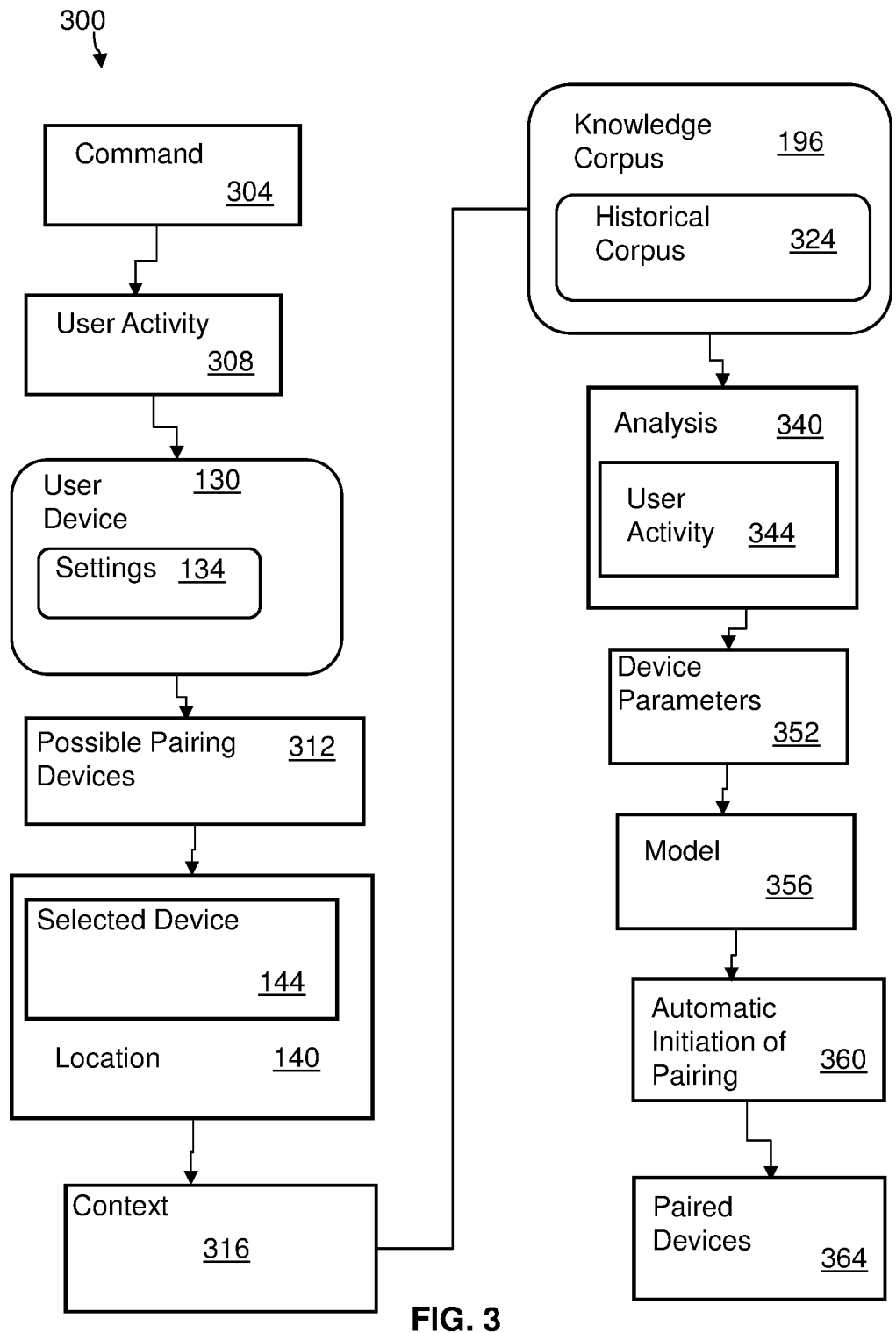
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for pairing multiple devices in an artificial intelligence (AI) ecosystem.

Referring to FIGS. 1, 2 and 3, a computer-implemented method 200 for pairing multiple devices in an artificial intelligence (AI) ecosystem, according to an embodiment of the present disclosure, includes operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes receiving, at a computer, a command to perform a user activity at a location which includes pairing a user device to a selectable device at the location. The computer can be a computer 131 in a device 130, or a computer 190 remote from the device 130. The computer 131 can communicate, all or in part with, a computer 172 which can be remote as part of a control system 170, or all or part of a remote server. The control system can include a computer 172 having a computer readable storage medium 173 which can store one or more programs 174, and a processor 175 for executing program instructions. The control system can also include a storage medium which can include registration and/or account data 182 and profiles 183 of users as part of user accounts 181. User accounts 181 can be stored on a storage medium 180 which is part of the control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can also communicate with the computer 131 of the device 130 and can be remote from the user device 130. In another example, the computer system 190 can be all or part of the control system, or all or part of the device 130. The depiction of the computer system 190 as well as the other components of the system 100 are shown as one example according to the present disclosure.

The new or different AI (Artificial Intelligence) ecosystem, or technology/communication or IT (Information Technology) ecosystem can include a local communications network 152 which can communicate with the communications network 160. The system 100 can include a learning engine/module 192, which can be at least part of the control system or communicating with the control system, for generating a model or learning model. In one example, the learning model can model workflow in a new AI or IT ecosystem for machine/devices in the new ecosystem.

In another example, the computer 131 can be part of a device 130. The computer can include a processor 132 and a computer readable storage medium 134 where an application 135 can be stored which can in one example, embody all or part of the method of the present disclosure. The application can include all or part of instructions to implement the method of the present disclosure, embodied in code and stored on a computer readable storage medium. The device can include a display 138. The device 130 can operate, in all or in part, in conjunction with a remote server by way of a communications network 160, for example, the Internet. The device 130 can be a mobile device such as a mobile phone, or tablet, or a laptop computer. The device or new device 144 objects can include static devices, such as printer, servers, routers, etc. The devices or new devices communicate with a communication network 152 in a new ecosystem at a new location 140. New machines and/or devices 144 are represented in FIG. 1, and it is understood that these represent one or more machines or devices at a new location and/or technology or IT (Information Technology) ecosystem.

Referring to FIGS. 1, 2, and 3, the method 200 can include receiving, at a computer 190, a command 304 to perform a user activity 308 at a location 140 which includes pairing a user device 130 to a selectable device 144 at the location, as in block 204. A command can be a verbal command spoken by the user within the vicinity of an AI device 148 which is adapted to receiving verbal commands. The AI device can communicate with an AI system 1575 (FIG. 7) residing all or in part in a cloud computing environment 2050 (FIG. 8) via a communications network 160.

The method includes analyzing, using the computer 190, context 334 of the command 304, the analysis 340 of the context of the command including an analysis 340 of the user activity 344 to determine device parameters 352 for the user activity 344, and the analysis 340 of the context 334 of the command 304 includes an analysis of a historical corpus 324, as part of the knowledge corpus 196 regarding pairings and connection history and preferences, as in block 208. The analysis of the context can include using natural language processing to generate text for the command, and using the historical corpus to search for similar command language and a related output or activity for the command. If there is not similar command language in the historical corpus, the system can determine context or meaning using other sources such as other databases for phrases and words, which may be accessed using the Internet. Such analysis can be all or part of an AI system including machine learning.

The analysis 340 can include generating a model 352 of pairing scenarios for the user device with devices at the location. Such a model can be an output at least in part of an AI system analysis using machine learning.

The computer 131 can use a knowledge corpus database 196 to determine previous communication types, and protocols, as well as a historical record, as part of the historical context. The knowledge corpus 196 can be populated by historical data gathered from the user device and related to the device communications and pairing history. The pairing history to devices can include IoT devices, stationary devices, mobile devices, etc. The computer can use the knowledge corpus 196 to determine a workflow for the device and better predict and initiate pairing to new devices when the user device is in a new location. Further, the computer can use the knowledge corpus to determine compatibility of devices, for instance, protocol compatibility. In one example, the method can determine the user device specifications, for instance by auto detection or by a user input, and the method can detect specifications of new devices by detecting and analyzing the new devices' communication to join or communicate with other devise, for example, a WiFi protocol or standard for the new device. WiFi includes a family of wireless network protocols, based on the IEEE 802.11 family of standards, which are commonly used for local area networking of devices and Internet access. The method can analyze the user device specification and the new devices parameters including protocols and determine how the user device can communicate with the new device, such as settings in the user device.

The method includes determining possible pairing devices based on the analysis including the device parameters, as in block 212. The possible pairing device can include other mobile devices, or static machines, such as printers.

The method includes selecting a device at the location from the possible pairing devices based on the analysis, as in block 216.

The method includes initiating pairing of the user device to the selected device at the location based on the analysis of the context of the command, as in block 220.

The method includes automatically pairing the user device to the selected device at the location to perform the user activity, as in block 224.

When pairing is not completed at block 228, the method can return to block 208. When pairing is completed at block 228, the method ends.

In one example, the command can be a voice command. In another example, the receiving of the command includes receiving the command at an AI voice assistance system. In another example, the device at the location is at least part of an AI connected system.

In another example according to the present disclosure, the method further includes determining specifications for the user device to pair with the possible pairing devices based on the analysis including the analysis of the historical corpus. The specifications can include pairing protocols. The selecting of the device at the location from the possible pairing devices is based on the analysis and the determined specifications. The initiating of the pairing of the user device to the selected device at the location is based on the analysis of the context of the command. The initiation includes adjusting settings on the user device based on the determining of the specifications for the user device.

In one example, the method further includes determining which of a plurality of devices to pair with the user device, based on the analysis of the context of the command.

In another example, the method can further include determining a length of time paired devices will remain paired, based on a type of activity being performed using the user device.

In another example, the method can include identifying a user activity with the user device at the location using the computer and the AI voice assistance system. The method includes determining which of a plurality of devices at the location to pair with the user device, based on the analysis of the context of the command and the identification of the user activity.

In another example the method can include evaluating security in relation to pairing the user device with the device at the location.

In another example, the method can include evaluating security in relation to pairing the user's device with the device at the location. And the method includes generating voice based security questions for a user based on the evaluated security, wherein the voice based security question including permission for pairing.

In another example, the method further includes identifying when a device of a plurality of devices in the location is currently engaged in an activity. The method includes identifying an alternate device of the plurality of devices for pairing with the user device in response to the identification of the device being engaged.

In another example, the method further includes determining a user activity being performed with the user device, and the identification of the alternate device includes determining one or more alternate devices at the location which can be used for the user activity.

In another example, the method further includes generating a model, at least in part, incorporating the analyzing of the context of the command. The method includes updating the analysis of the context of the command, updating the adjustment of the settings on the user device based on the updated analysis, updating the determination of the user activity, updating the selection of the device at the location to perform the updated user activity, and updating the automatic pairing of the user device to the updated selected device to perform the user activity.

In another example, the method further includes determining a workflow function for the user device based on the activity; analyzing devices at the location for availability and compatibility with the user device; and determining an updated workflow for the location based the availability and compatibility of the available devices at the location with the user device.

In another example, the method further includes determining, using the historical knowledge corpus, which of a plurality of devices at the location to pair to the user device.

In another example, the method further includes identifying the activity of the user by analyzing information received from the user device; and determining which devices of a plurality of devices at the location to pair to the user device based on the activity.

A user can use an augmented reality device 137 having a display 138. In one example, the augmented reality (AR) device can be an AR headset. In another example, the augmented reality device can be AR glasses. Using the AR device can include a visual cue to a user, a selection of one or more options by the user, or a physical action such as a hand gesture or a finger pointing, wherein such physical actions can work in concert with the AR device to implement an action initiated by the user. The AR device can communicate with the user's device 130, and/or alternatively, communicate with a communications network 160.

In another example, the user's device includes or communicates, at least in part, with an augmented reality (AR) device, the AR device being wearable by the user to assist in locating identified objects.

Figure 4:
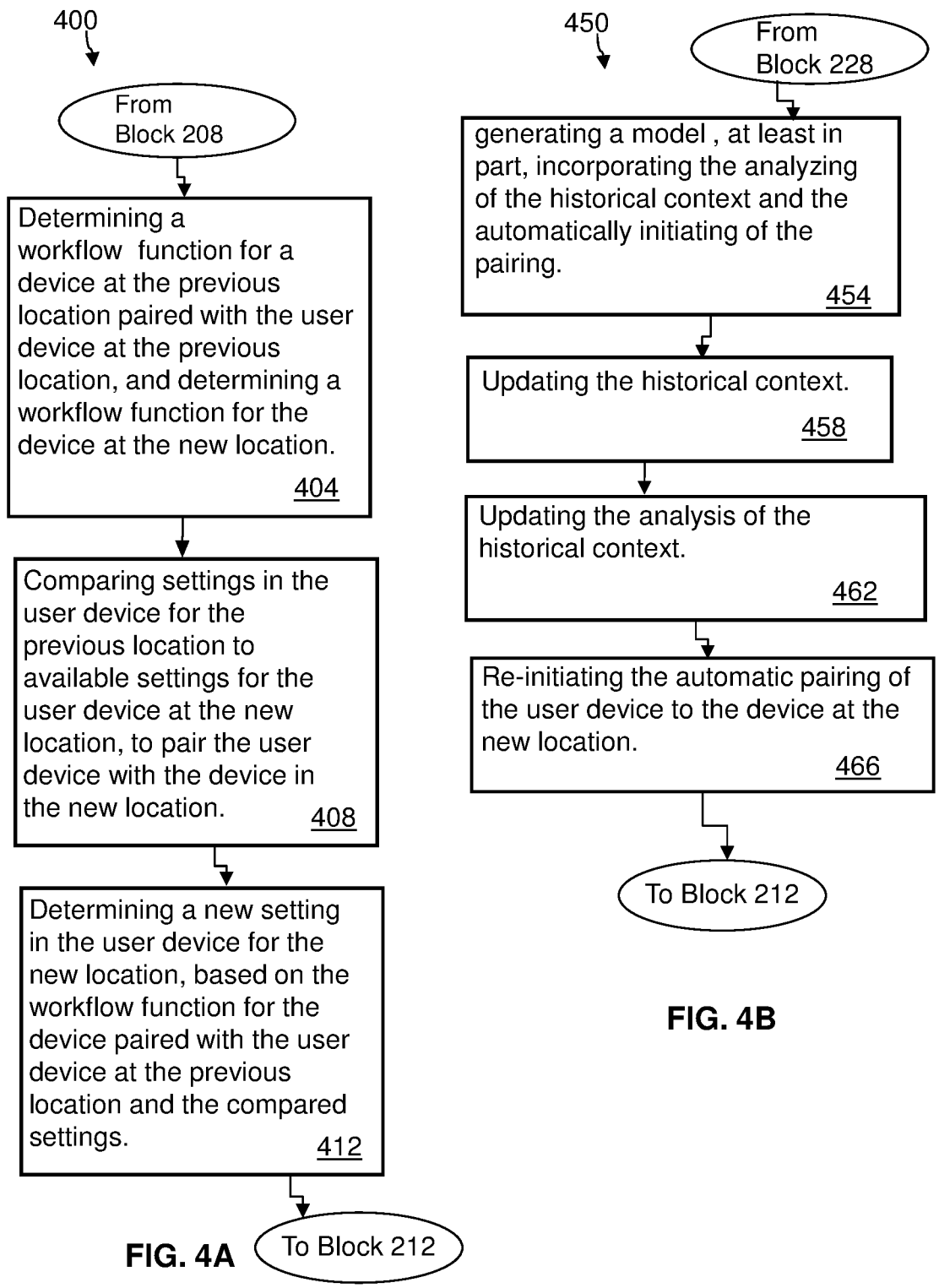
FIG. 4A is a flow chart illustrating another method, which continues from the flow chart of FIG. 2, for pairing multiple devices in an artificial intelligence (AI) ecosystem.
FIG. 4B is a flow chart illustrating another method, which continues from the flow chart of FIG. 2, for pairing multiple devices in an artificial intelligence (AI) ecosystem, and which generates and uses a computer model.

Referring to FIG. 4B, in another embodiment according to the present disclosure a method 450 can continue from block 228 of the method 200 shown in FIG. 2, and the method 450 includes generating a model at least in part incorporating the assessing of the identified objects, the scoring of the identified objects, and the ranking of the identified objects, as in block 454. The method includes updating a definition of the vicinity, and updating the location of the objects in the updated vicinity, as in block 458. The method includes updating the assessing of the identified objects for applicability relating to the event, as in block 462. The method includes updating the scoring of the identified objects based on each of the identified objects applicability relating to the event, as in block 466. The method includes updating the ranking of the identified objects, based on the updated score and updated accessibility factors, the updated accessibility factors including the updated location of the updated identified objects, respectively, in relation to the user 120 or the event, as in block 470. The method includes sending an updated notification to the user's device with the updated ranking for viewing by the user on the display of the user's device, as in block 474. The method can further include iteratively updating the updated notification based detecting a change of a parameter of the event.

In another example, the method can further include initiating two way communications with an AR device available to the user, and generating, using the computer communicating with the AR device, a recommendation for a procedure. The method can include communicating the procedure to the AR device for communication to the user; and iteratively communicating updated procedures to the AR device.

In another embodiment according to the present disclosure, referring to FIG. 4B, a method 450 can continue from block 208 of the method 200 shown in FIG. 2, the method can include generating a model 312 at least in part incorporating the determining of the specifications from the existing AI ecosystem, as in block 454. The method further includes updating the specifications from the existing AI ecosystem, as in block 458. The method includes updating specifications from the new ecosystem, as in block 462. The method further including updating the applying of the specifications from the existing AI ecosystem to the new AI ecosystem, as in block 466. The method 450 then can proceed to block 224 of the method 200 in FIG. 2.

In another example, the method can further include the existing ecosystem communicating with the cloud based account using a communications network. In another example, the historical data can be stored in a knowledge corpus database. In another example, the remote-based account can be cloud based.

In another example, related to the method 450, the model 312 can include determining, using the computer, a type of machine and workflow, using the knowledge corpus database 156 to determine a type of machine, a type of workflow, or define one or more workflows. The knowledge corpus 156 can be populated by historical data related to machine/devices, environments, AI ecosystems, etc., gathered from previous environments and histories. In one example the data from historical events can be automatically gathered, and in another example, data can be inputted into the computer or directly into the corpus automatically, manually, or a combination of both, or in another example or from the computer to the corpus, such as from IoT devices, etc. In one example, the computer can identify machine or devise in the AI environments by comparing a visual picture or video feed of an object to a corpus database of items. The identification can be scored for veracity or confidence of identification with a confidence score.

In another example, a user can use an augmented reality device having a display 138. In one example, the augmented reality (AR) device can be an AR headset. In another example, the augmented reality device can be AR glasses, or an AR wearable. Using the AR device can include a visual cue to a user, a selection of one or more options by the user, or a physical action such as a hand gesture or a finger pointing, wherein such physical actions can work in concert with the AR device to implement an action initiated by the user, or select options presented to the user using the system. For instance, a user can select workflow options and/or machines. The AR device can communicate with the user's device 130, and/or alternatively, communicate with a communications network 160.

In another example, the method can further include initiating two-way communications with an AR device available to the user, and generating, using the computer communicating with the AR device, a recommendation for a workflow or a procedure in an AI ecosystem. The method can include communicating the workflow or procedure to the AR device for communication to the user, and iteratively communicating updated procedures to the AR device. The method can further include receiving an update request from the AR device initiated by the user. In one example, the method can include receiving acceptance of the recommendation for a workflow or a procedure from the user's device.

Other Embodiments and Examples

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 150 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for users/participants. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

More Embodiments and Examples

Figure 5:
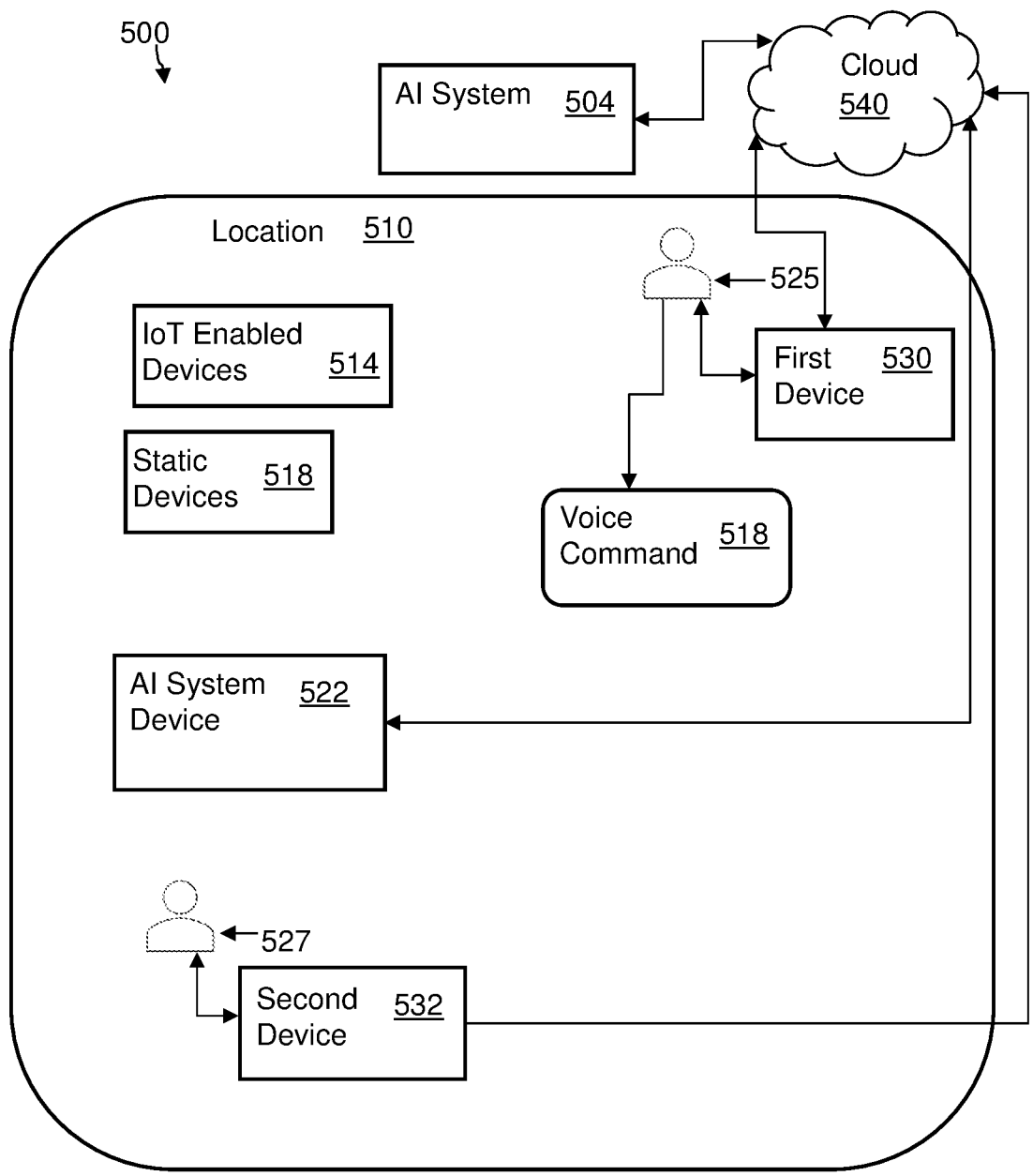
FIG. 5 is a block diagram illustrating another system according to an embodiment of the present invention, for pairing multiple devices in an artificial intelligence (AI) ecosystem.

Referring to FIG. 5, in one embodiment according to the present disclosure, a system 500 can be used for pairing multiple devices in an artificial intelligence (AI) ecosystem.

In one example, a method and system according to the present disclosure can include wherein based on user's voice command a user can pair devices. An AI voice assistance system can identify a user's contextual need for a device based on a voice command, and accordingly, the device can be paired to another device.

In one example, for pairing devices, a user can submit a voice command to an AI voice assistance system by specifying the device names which are to be paired, and accordingly the AI voice assistance system can identify a relative position and distance of a target device or devices, wherein the devices to be paired and appropriate device pairing protocols are selected for pairing the devices.

In another example, a user can submit a voice command related to an activity to an AI voice assistance system, and accordingly the AI voice assistance system can use a historical knowledge corpus to predict which devices are to be paired. A method and system of the present disclosure can include dynamically pairing the devices so that the user can perform the activity.

When the voice command is submitted to AI voice assistance system, then the method and system can identify if any of the candidate devices are already engaged, and accordingly the AI voice assistance system can pair alternate devices which can be paired to perform the user's activity. Based on the voice command of the user, the method and system can predict how long the devices should remained as paired to perform the activity, so that other users will be able to know when the device should be free.

When devices are paired, the method and system can evaluate appropriate security, and accordingly the AI voice assistance system can inquire for appropriate voice-based permission during paring, (e.g., a user mobile can be paired with another user's mobile device, where the user has asked to be paired, the other user can also provide voice-based approval for pairing).

Referring to FIGS. 5, in an embodiment according to the present disclosure, a system 500 includes a location 510. For example, the location can be an office, a workstation, a conference center, or a home office, etc. The location can include Internet of Things (IoT) devices 514, such as in one example, a printer, and static devices, such as a router. A first user 525 can have a first mobile device 530, and a second user 527 can have a second mobile device 532. The devices 530 and 532 are representative of multiple devices such as, for example, mobile devices or laptops. Users can also be part of a team of users which can include users/people. It is understood that a team could have one or more users. Each user could have one or more devices which are used by each of the users as their own device(s) and/or as team devices. The mobile devices shown in FIG. 5A are representative of two or more mobile devices. In another example, an office setup in a location can include printers, Wi-Fi routers, etc. Devices in the location can connect to a cloud environment 540, for example, the devices 530 and 532 can connect to a cloud system. For example, a cloud environment can include computer system resources, including data storage, i.e., cloud storage.

The location 510 can include an Artificial Intelligence (AI) system device 522, such as a voice activated AI device communicating with an AI system 504 shown as communicating with the AI device using the cloud environment 540. The first user 525 can verbally or vocalize a voice command 518, which can be communicated or received by the AI device 522.

In other embodiments and examples, in an IoT (Internet of Things) ecosystem each IoT enabled device 514 can be identified uniquely using a method and system, and the system can also identify devices which are paired. The system can identify how the devices are communicating with each other to perform any activity. Each device can share information while performing the activities, and accordingly the system communicating with each of the devices can identify what activities are performed by the devices. The system can identify which information is shared among the devices while performing the activities. The system can analyze a multi-device ecosystem and the received information generated by each device and can identifying what activities are performed. The system can analyze the multi-device ecosystem and recognize each activity individually, and can also identify what the steps are for each activity. The system can identify how different devices are participating in the activities, for example, what data is generated, how the generated data is used, what activity and decision is taken from that gathered data, etc.

The system can identify from a historical corpus, activities performed, steps performed, device data generation, how generated data is used in an activity, device specifications, etc., and accordingly machine learning can be performed on the gathered data to identify how different devices are involved in the activities, and the roles of various devices etc. Based on the historical learning, the system can recognize how different devices participate in a workflow and the role of the devices. The devices can be identified based on specifications, so specifications and role of the devices in the workflow can be considered to recognize the devices individually. The system can also recognize the devices based on the activities, in one case, the system can identify which devices are required to perform an activity. Based on a specification, the system can identify which devices are static and which devices are mobile.

Referring to FIG. 5, in one example, a first user 525 can verbalize a voice command 518. In one example, a voice command can include a command such as "I want to transfer videos from my device or the first device 530 to a second device 532". The AI system device can receive the command, and the AI system can recognize a target device, in this example, the second device 532. The AI system can pair the first device to the second device.

In one example, a system according to the present disclosure can include one or more devices can be identified uniquely, and the devices can have specific metadata to perform various activities. The devices can include one or more types of device paring protocols. Different wireless connection protocols can have different distance ranges of pairing capability. An AI voice assistance system can include historical learning different types of voice commands and device pairings.

The system can identifying which devices are involved to perform various activities. The system can create a knowledge corpus from the historical learning, and can identify how the devices can be paired. The knowledge corpus can include different types of device activities and how the devices are involved. The system can include tracking security needs for device pairing, and accordingly, the system can receive voice signatures and can recognize a user.

The devices in the ecosystem can have one or more names. The names of the devices can be part of the device metadata and the name can be known by the AI Voice assistance knowledge corpus. In one example, the purpose of device pairing can be file sharing or another activity, and while submitting historical activities the devices can be paired and file sharing or other activity can be learnt by the AI system, and this added to the historical corpus.

The AI system device can be connected with or aware of the devices in the surrounding location or environment, but the devices may not be paired. If a user wants to pair a device, then the user can submit a voice command with the device name to be paired. The AI system can identify the devices in location and accordingly pair the devices. During pairing, the system can initiate the device pairing request from a sending device, such as the first device. The request to a target device, such as the second device, can be auto executed by AI system.

In another example, if a device is to be paired is unknown or a new user is requesting pairing, then the system can send for required approval. In one example, the AI system can request the user to provide voice approval. Based on the validation of the voice approval, the system can initiate device paring. User can also submit a voice command related to user activities, and accordingly the AI system can analyze the types of activities to be performed and the devices to be paired. The AI system can pair the devices based on the voice command. Based on the voice command, the proposed system can identifying how long the devices should be paired, and accordingly the system can un-pair devices or can engage or re-pair devices. When submitting a voice request to pair a device, the system can identify a target device already engaged or switched off, then, based on a user's activity, an alternate device can be paired.

Thus, embodiments of the present disclosure, use an AI voice assistant to authenticate the user and to derive the function that the user intends to perform using natural language processing algorithms. Further, based on the function that the user intends to perform between the paired devices, the system can determine the most appropriate protocol to be used for pairing.

More Examples and Embodiments

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

Figure 6:
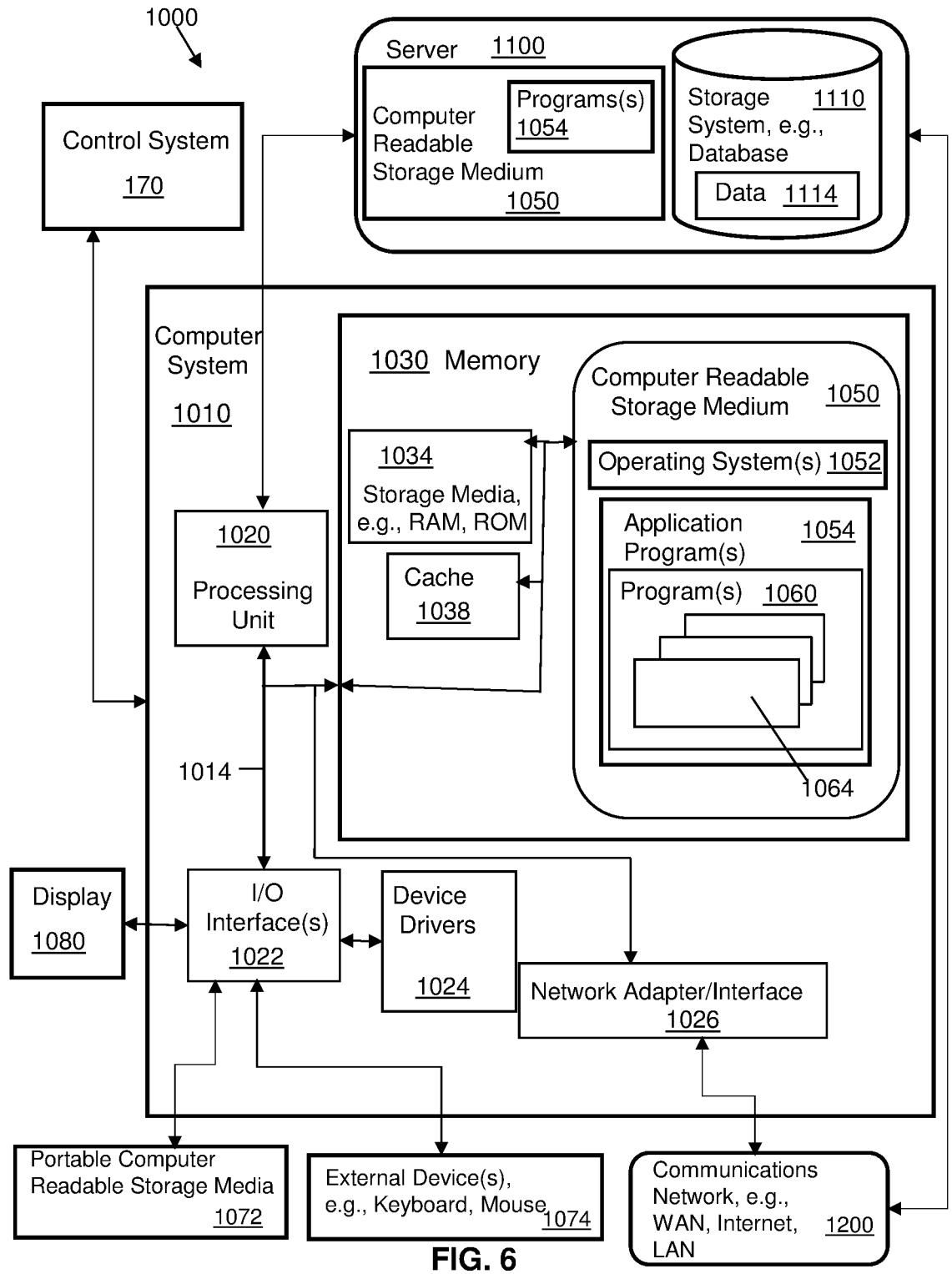
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 7 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 7 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model for monitoring and enhancing performance of containers using a calibration technique.

An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or more AI ecosystems or environments.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
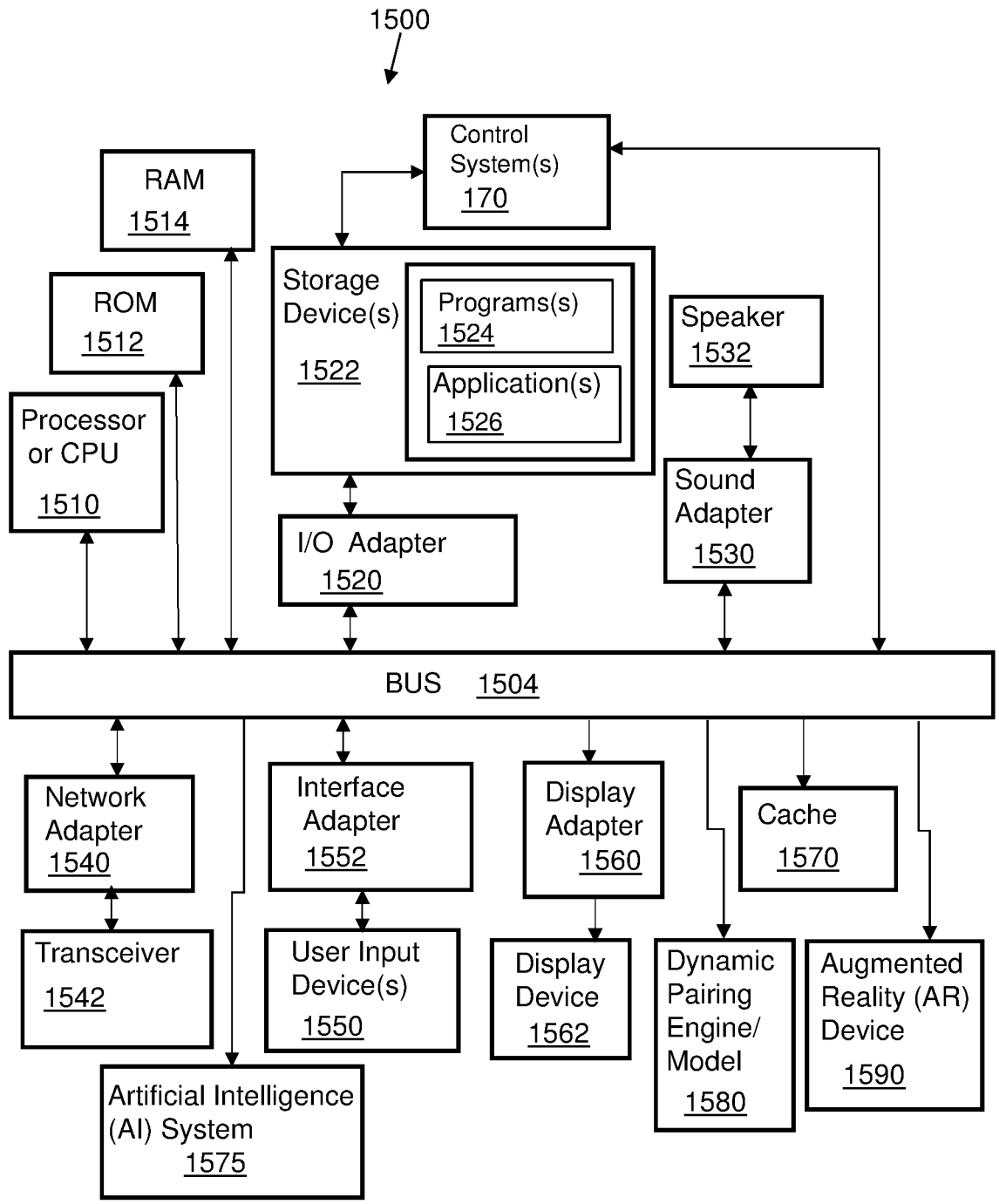
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1580 can also be operatively coupled to the bus 1504. A dynamic pairing engine/model 1580 can also be operatively coupled to the bus 1504. An artificial intelligence (AI) ecosystem 1575 can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
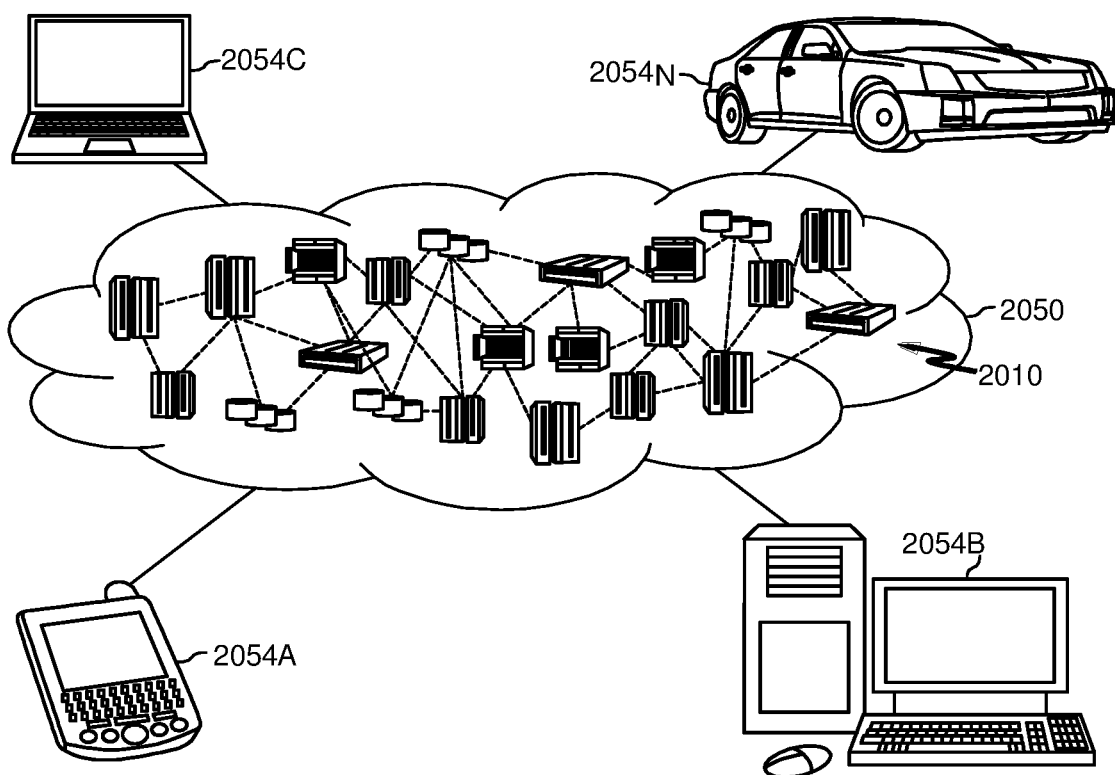
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
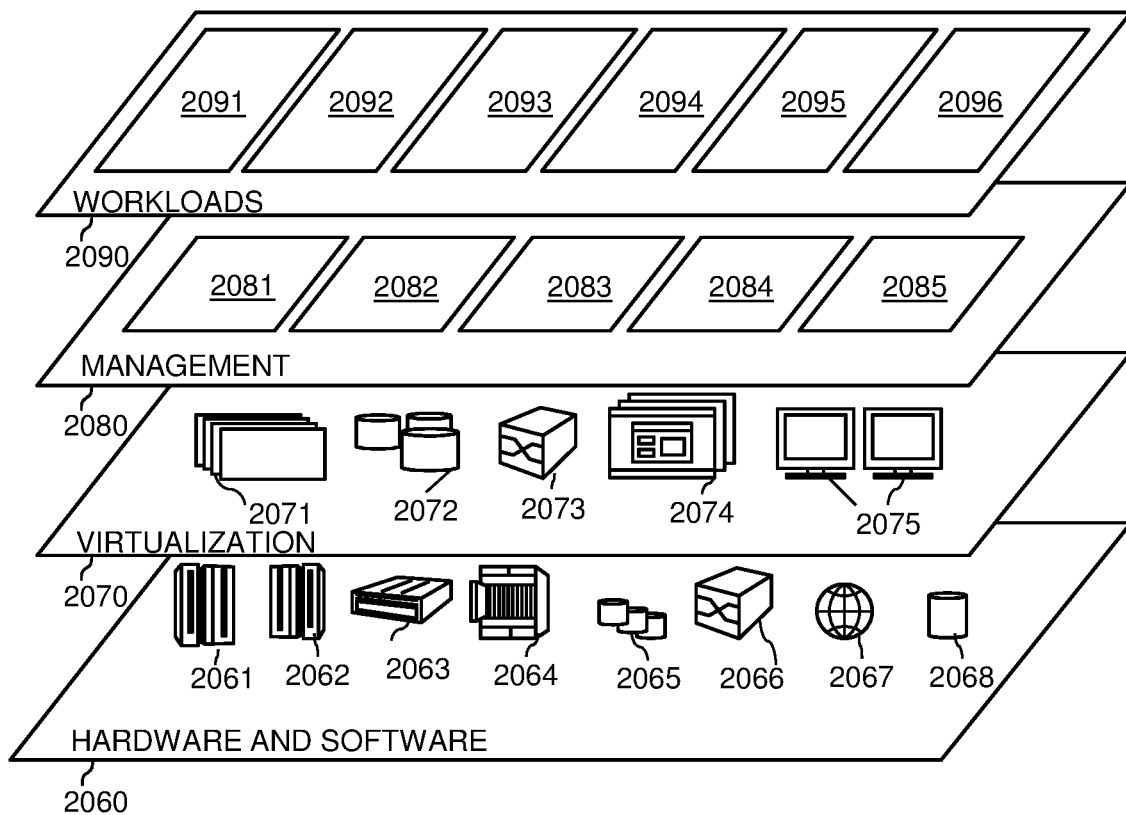
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and implementing dynamic pairing of devices 2096, for example, dynamic pairing of devices in an AI ecosystem.

What is claimed is:

1. A computer-implemented method for pairing multiple devices in an artificial intelligence (AI) ecosystem, comprising:
   receiving, at a computer, a command to perform a user activity at a location which includes pairing a user device to a selectable device at the location;
   analyzing, using the computer, context of the command, the analysis of the context of the command including an analysis of the user activity to determine device parameters for the user activity, and the analysis of the context of the command including an analysis of a historical corpus regarding pairings and connection history and preferences;
   determining possible pairing devices based on the analysis including the device parameters;
   selecting a device at the location from the possible pairing devices based on the analysis;
   initiating pairing of the user device to the selected device at the location based on the analysis of the context of the command; and
   automatically pairing the user device to the selected device at the location to perform the user activity:,
   wherein the initiating of the pairing of the user device to the selected device at the location being based on the analysis of the context of the command includes adjusting settings on the user device based on determining specifications for the user device to pair with the possible pairing devices based on the analysis including the analysis of the historical corpus.

2. The method of claim 1, wherein the command is a voice command.

3. The method of claim 1, wherein the receiving of the command includes receiving the command at an AI voice assistance system.

4. The method of claim 1, wherein the device at the location is at least part of an AI connected system.

5. The method of claim 1, further comprising:
   the specifications including pairing protocols; and
   the selecting of the device at the location from the possible pairing devices being based on the analysis and the determined specifications.

6. The method of claim 1, further comprising:
   determining which of a plurality of devices to pair with the user device, based on the analysis of the context of the command.

7. The method of claim 1, further comprising:
   determining a length of time paired devices will remain paired, based on a type of activity being performed using the user device.

8. The method of claim 1, further comprising:
   identifying a user activity with the user device at the location using the computer and an AI voice assistance system; and
   determining which of a plurality of devices at the location to pair with the user device, based on the analysis of the context of the command and the identification of the user activity.

9. The method of claim 1, further comprising:
   evaluating security in relation to pairing the user device with the device at the location.

10. The method of claim 1, further comprising:
    evaluating security in relation to pairing the user's device with the device at the location; and
    generating voice based security questions for a user based on the evaluated security, the voice based security question including permission for pairing.

11. The method of claim 1, further comprising:
    identifying when a device of a plurality of devices in the location is currently engaged in an activity; and
    identifying an alternate device of the plurality of devices for pairing with the user device, in response to the identification of the device being engaged.

12. The method of claim 11, further comprising:
    determining a user activity being performed with the user device; and
    wherein the identification of the alternate device includes determining one or more alternate devices at the location which can be used for the user activity.

13. The method of claim 1, further comprising:
generating a model, using the computer, which at least in part, incorporates the analyzing of the context of the command; and the model including:
updating the analysis of the context of the command;
updating the adjustment of the settings on the user device based on the updated analysis;
updating the determination of the user activity;
updating the selection of the device at the location to perform the updated user activity; and
updating the automatic pairing of the user device to the updated selected device to perform the user activity.

14. The method of claim 13, further comprising:
iteratively generating the model to produce updated models.

15. The method of claim 1, further comprising:
determining a workflow function for the user device based on the activity;
analyzing devices at the location for availability and compatibility with the user device; and
determining an updated workflow for the location based the availability and compatibility of the available devices at the location with the user device.

16. The method of claim 1, further comprising:
determining, using the historical knowledge corpus, which of a plurality of devices at the location to pair to the user device.

17. The method of claim 1, further comprising:
identifying the activity of the user by analyzing information received from the user device; and
determining which devices of a plurality of devices at the location to pair to the user device based on the activity.

18. A system using a computer for initiating pairing multiple devices in an artificial intelligence (AI) ecosystem, which comprises:
a computer system comprising; a computer processor, a computer-readable storage medium, and program instructions stored on the computer-readable storage medium being executable by the processor, to cause the computer system to perform the following functions to;
receive, at a computer, a command to perform a user activity at a location which includes pairing a user device to a selectable device at the location;
analyze, using the computer, context of the command, the analysis of the context of the command including an analysis of the user activity to determine device parameters for the user activity, and the analysis of the context of the command including an analysis of a historical corpus regarding pairings and connection history and preferences;
determine possible pairing devices based on the analysis including the device parameters;
select a device at the location from the possible pairing devices based on the analysis;
initiate pairing of the user device to the selected device at the location based on the analysis of the context of the command; and
automatically pair the user device to the selected device at the location to perform the user activity;
wherein the initiating of the pairing of the user device to the selected device at the location being based on the analysis of the context of the command includes adjusting settings on the user device based on determining specifications for the user device to pair with the possible pairing devices based on the analysis including the analysis of the historical corpus.

19. The system of claim 18, wherein the command is a voice command.

20. A computer program product for initiating pairing multiple devices in an artificial intelligence (AI) ecosystem, the computer program product comprising a computer readable storage medium having program instructions embodied therewith, the program instructions executable by a computer to cause the computer to perform functions, by the computer, comprising the functions to:
receive, at a computer, a command to perform a user activity at a location which includes pairing a user device to a selectable device at the location;
analyze, using the computer, context of the command, the analysis of the context of the command including an analysis of the user activity to determine device parameters for the user activity, and the analysis of the context of the command including an analysis of a historical corpus regarding pairings and connection history and preferences;
determine possible pairing devices based on the analysis including the device parameters;
select a device at the location from the possible pairing devices based on the analysis;
initiate pairing of the user device to the selected device at the location based on the analysis of the context of the command; and
automatically pair the user device to the selected device at the location to perform the user activity;
wherein the initiating of the pairing of the user device to the selected device at the location being based on the analysis of the context of the command includes adjusting settings on the user device based on determining specifications for the user device to pair with the possible pairing devices based on the analysis including the analysis of the historical corpus.

* * * * *